April 2, 1946.    J. O. CLARK    2,397,776
CENTRIFUGAL HAMMER
Filed Dec. 29, 1941    2 Sheets-Sheet 1
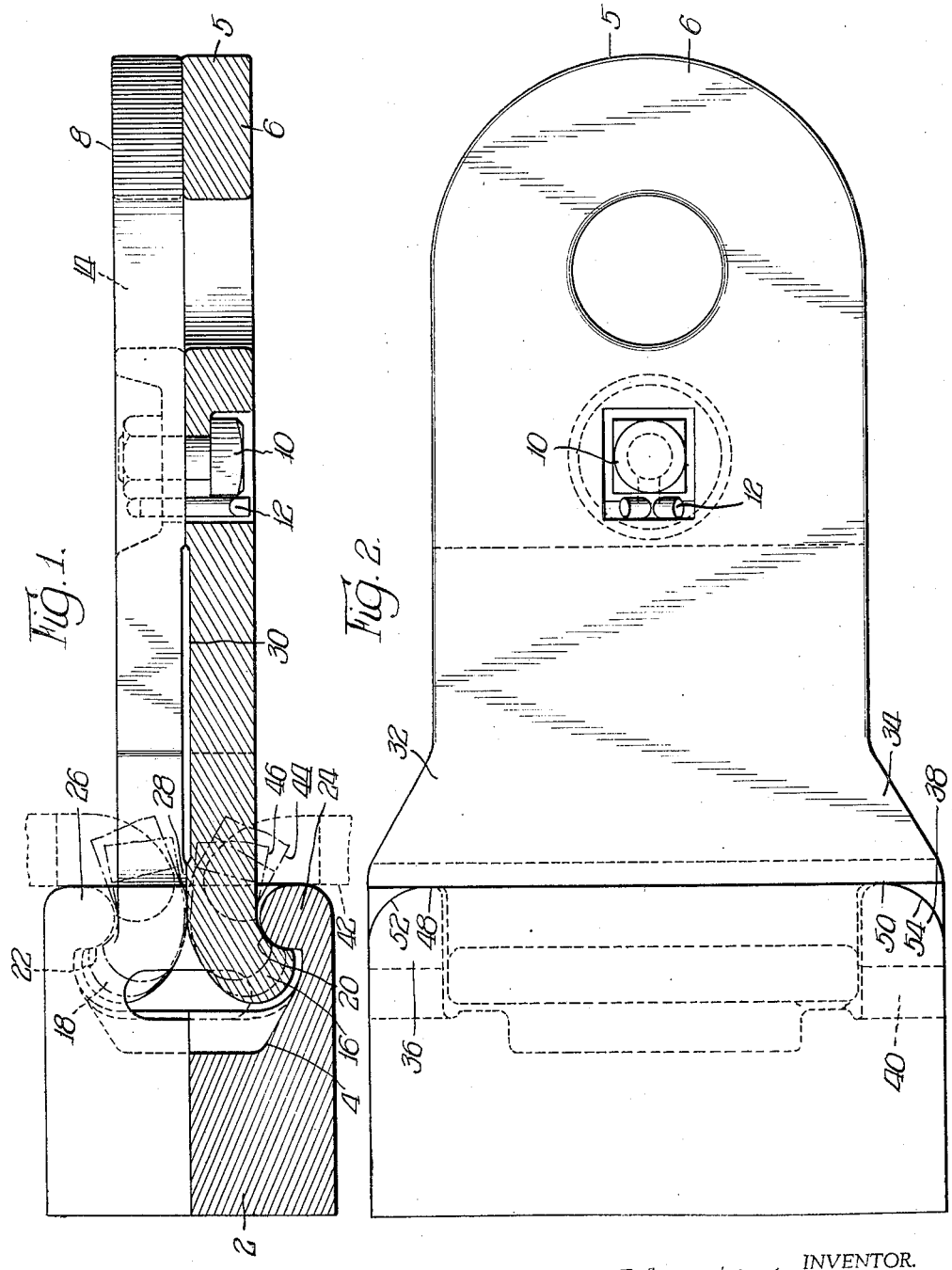
INVENTOR.
John O'Fallon Clark, April 2, 1946.　　　J. O. CLARK　　　2,397,776
CENTRIFUGAL HAMMER
Filed Dec. 29, 1941　　　2 Sheets-Sheet 2
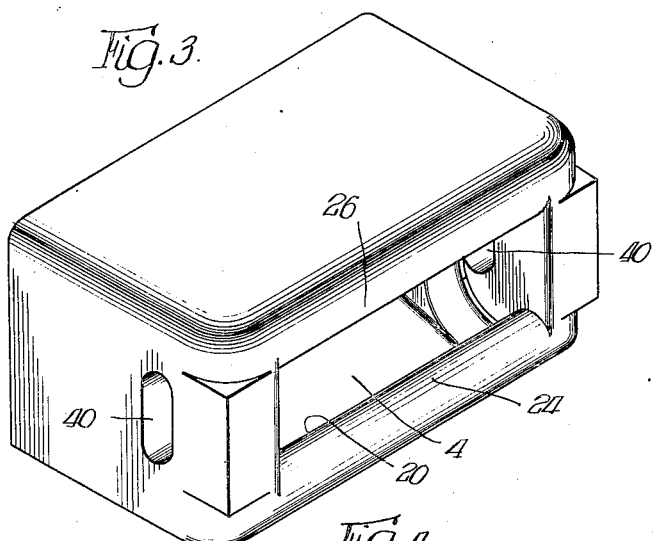
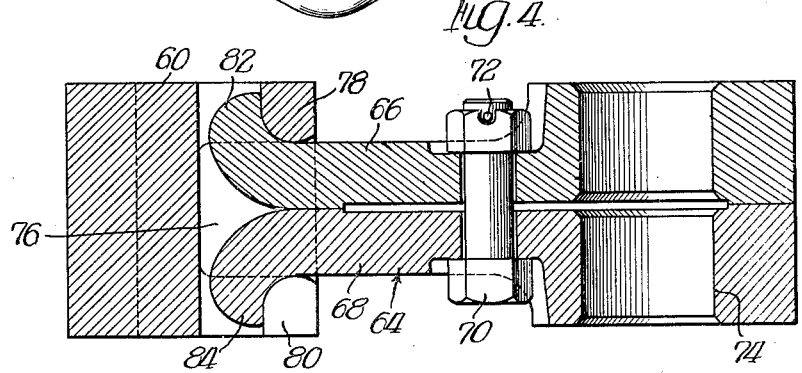
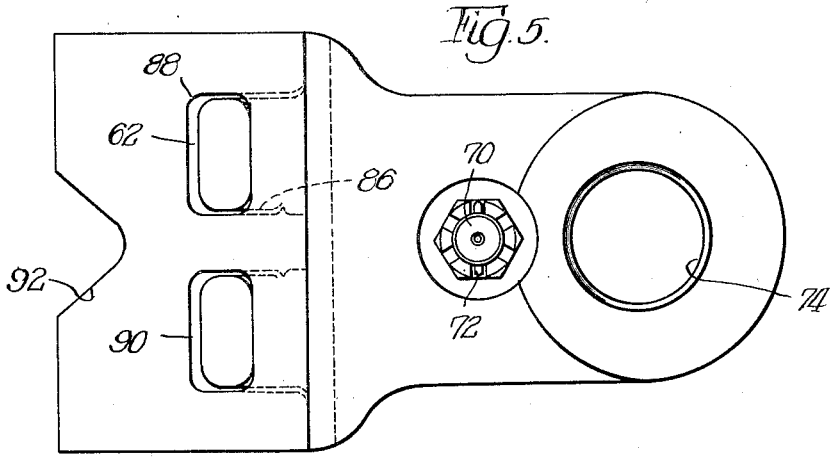
INVENTOR.
John O'Fallon Clark,
BY Wilkinson, Huxley, Byron & Knight
ATTYS.

Patented Apr. 2, 1946

2,397,776

UNITED STATES PATENT OFFICE 2,397,776

CENTRIFUGAL HAMMER

John O'Fallon Clark, University City, Mo., assignor to American Brake Shoe Company, a corporation of Delaware Application December 29, 1941, Serial No. 424,765

5 Claims. (Cl. 241—197)

The present invention relates to rotary hammers of the type generally used in rock crushers, pulverizers or the like, the present invention being a continuation in part of application Serial No. 400,359, filed June 30, 1941, for Centrifugal hammer.

Among the objects of the present invention is to provide a novel hammer having a weighted work performing head pivotally connected to a rotary element through the medium of a pair of complementary bars forming a shank and which is interlocked with respect to said work performing head.

More particularly, the present invention includes as an object the provision of a pair of complementary bars forming the shank for the tool, which are of like construction, having at one end thereof oppositely disposed claws when the said bars are connected together adapted to engage with overhanging saddles provided on the work performing head to interlock the said shank and head.

Another object within the purview of the present invention is to provide a novel interlock between a work performing head of a rotary hammer and its suspending shank comprising two complementary bars adapted, when in engaging relation, to hold the work performing head rigidly in operative position, yet having means forming the interlock whereby the said head, after wear thereon, may be quickly removed from said shank and replaced by another work performing head.

Since the present invention relates to a tool in the form of a rotary hammer which is subjected to considerable pounding and wear during use, the interlock herein contemplated involves an association of the work performing head and the pair of complementary bars interlocked in such a manner as to provide a rigid connection therebetween, yet providing for the ready and easy assembly and disassembly of the work performing head with respect to the shank.

In the more specific aspect of the invention, one of the objects is to provide a novel connection between the work performing head and two complementary bars constituting the suspending shank therefor wherein the said head is formed with a recess having opposite confines thereof provided with overhanging saddles adapted to cooperate with complementary surfaces forming the hollows for oppositely disposed claws provided at the ends of the said complementary bars and in which the said bars adjacent the end formed with said claws are provided with fulcruming shoulders adapted to cooperate with the head during movement of the said bars into interlocking relation with the head whereby the claws are drawn into firm engagement with the said saddles, thus providing a rigid yet easily replaceable interlocking connection for the head on said suspending shank.

The present invention further comprehends a rotary hammer assembly of the type hereinabove set forth in which the weighted work performing head has its socket divided by way of a transverse wall and in which the bars are bifurcated to straddle the said wall, thus further providing an effective interlock between the said bars and work performing head. As an additional feature of this construction, the said work performing head has its opposed walls provided with substantially aligned openings whereby access can be gained to the socket for cleaning purposes.

Other objects, features, capabilities and advantages are comprehended by the invention, as will later appear and as are inherently possessed thereby.

Referring to the drawings:

Figure 1 is a view partly in end elevation and partly in section of a rotary hammer formed in accordance with the present invention;

Figure 2 is a view in front elevation of the rotary hammer shown in Figure 1 of the drawings;

Figure 3 is a view in perspective of the work performing head of the hammer shown in Figures 1 and 2;

Figure 4 is a longitudinal cross-sectional view of a modified form of construction for a rotary hammer made in accordance with the present invention; and Figure 5 is a front view in elevation of the rotary hammer shown in Figure 4 of the drawings.

Referring now more in detail to the drawings, a rotary hammer incorporating the novel features of construction according to the present invention is shown in Figures 1 to 3 inclusive as being constituted by a work performing head 2 formed with a recess 4 in its upper surface and which is replaceably mounted on a shank 5 comprising a pair of complementary bars 6 and 8 normally connected together in operative position through the medium of a bolt 10 which is locked by means of a cotter pin 12. The bars 6 and 8 adjacent one end thereof are provided with aligned openings 14 to provide means whereby the rotary hammer may be pivotally connected in a conventional manner to a rotary disc provided in the crusher or pulverizer in which the said hammer may be used.

The said bars 6 and 8 are provided at their head receiving ends with claws 16 and 18 which are received within the recess 4 of the work performing head and are formed with hollows 20 and 22 engageable with the overhanging saddles 24 and 26 forming opposed confines for said recess 4 which provide toe-holds that receive the said claws in interlocked relation to the head whereby the head is rigidly and effectively connected to the suspending shank 5. As will be seen in Figure 1 of the drawings, the said bars, when the claws thereof are in interlocking relation to the work performing head, have cooperative abutting surfaces as at 28 which position the said claws with respect to the saddles 24 and 26 to effect the rigid and tight engagement hereinabove referred to. Immediately above the cooperating surfaces 28 the bars are recessed as at 30 to avoid machining of these surfaces to provide a uniform fit between the bars, thus decreasing the expense involved in fabricating these tools.

Each of the bars 6 and 8 is further provided with laterally extending fulcruming shoulders 32 and 34 which are adapted to cooperate with the opposed walls 36 and 38 defining in part the recess 4 to force the claws 16 and 18 into their interlocking engagement with the saddles 24 and 26, respectively, when the said bars are rotated into position as will be later more fully explained.

According to the embodiment shown in Figures 1 to 3 inclusive, the recess 4 is of ample depth to provide a clearance space below the claws 16 and 18 and to cut down the weight of the hammer when worn out, it having been found that the metal provided below the recess 4 is sufficient for ordinary purposes. The shape and contour of the recess 4 have been chosen with these thoughts in mind. Furthermore, the walls 36 and 38 are provided with openings 40 extending laterally therethrough to admit of a chisel or chipping tool for cleaning out the pocket 4, and particularly to assure a clean and properly formed curved surface providing the toe-holds for the claws 16 and 18 on the underside of the saddles 24 and 26.

In assembling the rotary hammer according to the disclosure in Figures 1 and 2 of the drawings, the bars 6 and 8 are positioned as shown in dotted lines as at 42 and rotated toward the vertical, during which time the claws 16 and 18 slide or roll about the saddles 24 and 26 with their hollows 20 and 22 in cooperative relation to said saddles until such time as the said arms reach the position as shown in dotted lines as at 44. At this time the fulcruming surfaces 28 of the two bars engage one another, and further movement into the position as shown in dotted lines as at 46 causes the claws 16 and 18 to move laterally into toe-holding interlocked relation with the under surface of said saddles 24 and 26. In the position of the bars as shown in dotted lines at 46 the fulcruming shoulders 32 and 34 engage the fulcruming surfaces 48 and 50 of the walls 36 and 38, respectively, to facilitate the lateral movement of the claws 16 and 18 into interlocking engagement with the saddles as the fulcruming surfaces 28 of the bars maintain engagement between the inner faces of the same to assure proper seating relation of the claws to said saddles.

After the bars 6 and 8 are in their vertical position substantially normal to the work performing head 2, the bolt 10 may be placed in position with its nut tightened on the threaded end thereof to draw the two bars together into abutting relation along their inner faces to assure proper operative relation between the shank and the head. The cotter pin 12 is then inserted and spread to prevent loosening of this bolt during operation of the rotary hammer.

The joint as above described provides a novel interlock for the head which permits its ready assembly and disassembly with respect to the suspending shank therefor and provides a rigid connection which is able to withstand the excessive pounding and impact blows to which a device of the nature herein disclosed is subjected in a pulverizer or crusher mechanism.

As a further feature of construction, the walls 36 and 38 are curved as at 52 and 54 to eliminate any sharp or abrupt corners which might otherwise cause peening or damage to the edges of the discs or rotary elements to which these hammers are connected in a pulverizing machine, it being understood that during normal operation of these hammers the heads are held away from said rotary elements due to centrifugal force, but drop into contact therewith when the machine is stopped. Therefore the rounded corners 52 and 54, such as are provided herein, prevent peening or damage to the edges of the discs when the heads contact the same, thus avoiding any damage to the rotary hammers during their normal operating cycle.

The present invention further comprehends a modified form of construction for the rotary hammer as clearly shown in Figures 4 and 5 of the drawings, the said hammer comprising the work performing head 60 provided with a recess or socket 62 at its upper surface and which is replaceably mounted on a shank 64 comprising a pair of complementary bars 66 and 68 normally connected together in operative position through the medium of a bolt 70 which is locked by means of a cotter pin 72. The bars 66 and 68 adjacent one end thereof are provided with aligned openings 74 to provide means whereby the rotary hammer as shown in these figures may be pivotally connected in any conventional manner to a rotary disc provided in a crusher or pulverizer in which said hammer may be used, all as contemplated for the embodiment shown in Figures 1 to 3 inclusive.

The present illustrative embodiment of the invention, however, varies from that shown in Figures 1 to 3 inclusive in that the socket or recess 62 is sub-divided by a transversely extending wall 76 integrally formed with the work performing head and merging with the saddles 78 and 80 which are engaged by the claws 82 and 84 of the said bars 66 and 68, respectively. The claws 82 and 84 are of bifurcated construction in this embodiment, formed by a slot or groove such as 86 so that the said claws 82 and 84 straddle the dividing wall 76. This type of construction effects an efficient interlocking relation of the head and arms, yet provides for the ready and easy removal of the head when replacement or repair becomes necessary.

As a further feature of construction, the said work performing head has the substantially aligned openings 88 and 90 in the opposed walls defining the socket or recess 62, which permits the use of tools to clean the surfaces of the pocket or socket to secure proper bearing relation to the head with the arms 66 and 68. In this embodiment also the work performing head is provided with a centrally disposed cut-out portion 92 which decreases the metal at the point where the same is not needed, thus decreasing the cost of the finished article without in any way affecting the efficiency of the working parts of the head.

As will be apparent from Figures 4 and 5, the operating arms 66 and 68 are assembled with the operating head 60 in the same manner as the elements of the embodiment shown in Figures 1 and 2.

While I have herein described and upon the drawings shown an illustrative embodiment of the invention, it is to be understood that the invention is not limited thereto but may comprehend other constructions, arrangements of parts, details and features without departing from the spirit of the invention.

I claim:

1. A centrifugal hammer comprising a two part complementary suspending shank, a block shaped hammer head replaceably mounted on the ends of said shank, and means to maintain the two complementary parts in back to back parallel assembled relationship, each of said shank parts comprising a flat body portion including a common abutting fulcruming back surface and an arcuately forwardly curved claw end, the head comprising a work performing portion positioned away from the shank and a shank end receiving portion positioned toward the shank, a central open recess within said latter portion of such size as to snugly accommodate the claw ends of the complementary shank parts, the opening to the recess being bounded by two pairs of walls, one pair of walls including overhanging inwardly directed shoulders of such arcuate convex shape within the recess as to conform to the arcuate claw ends of the two part complementary shank.

2. A reducing implement for use in rotary reducing mills comprising a two part complementary shank each constructed at their head receiving ends with a claw disposed in opposed relation to one another and including a common abutting fulcruming back surface intermediate said opposed claws, a head replaceably mounted on the ends of said shank, the head comprising a work performing portion positioned away from the shank and a shank end receiving portion positioned toward the shank, a recess within said latter portion of such size as to snugly accommodate the claw ends of the complementary shank parts, a pair of shoulders integral with said head overhanging said recess and being of such shape as to conform to the claw ends of said shank parts.

3. A reducing implement for use in rotary reducing mills comprising a block shaped hammer head for replaceable mounting on the end of a suspending shank, said head comprising a work performing portion positioned away from the shank and a shank end receiving portion positioned toward the shank, a central open recess within the latter portion of such size as to snugly accommodate the shank end, said recess being bounded by two pairs of walls including overhanging inwardly directed shoulders of such shape within said recess as to conform to the shape of the head engaging portion of said shank, and substantially aligned openings in opposite walls of said recess communicating with said recess for cleaning the same.

4. A tool comprising a suspending shank and a work performing head replaceably mounted on said shank, said shank comprising a pair of complementary bars each constructed at their head-receiving ends with a claw disposed in opposed relation to one another and including common abutting fulcruming surfaces intermediate said opposed claws, said head having a socket that receives and interlocks with said shank through the medium of said claws when the said bars, extending laterally of said socket and in opposed relation with their claws approximately over said socket, are rotated to move said claws into said socket and to bring the same together in normal position upstanding from said socket with said fulcruming surfaces in cooperative relation, said socket having two opposite confines that comprise saddles fitting the hollows of the claws and supporting said bars in their rotation, said saddles overhanging in said socket and forming undercut toe-holds that receive the claws in interlocked relation to said head, and said work performing head being provided in opposed walls forming said socket with substantially aligned openings communicating with said socket for cleaning the same.

5. A tool comprising a suspending shank and a work performing head replaceably mounted on said shank, said shank comprising a pair of complementary bars each constructed at their head-receiving ends with a claw disposed in opposed relation to one another and including common abutting fulcruming surfaces intermediate said opposed claws, said head having a socket that receives and interlocks with said shank through the medium of said claws when the said bars, extending laterally of said socket and in opposed relation with their claws approximately over said socket, are rotated to move said claws into said socket and to bring the same together in normal position upstanding for said socket with said fulcruming surfaces in cooperative relation, said socket being divided by a transverse wall, said claws being of bifurcated construction adapted to straddle said transverse wall, said socket having two opposite confines that comprise saddles fitting the hollows of the claws and supporting said bars in their rotation, said saddles overhanging in said socket and forming undercut toe-holds that receive the claws in interlocked relation to said head, and said work performing head being provided in opposed walls forming said socket with substantially aligned openings communicating with said socket for cleaning the same.

JOHN O'FALLON CLARK.